United States Patent [19]
Crosbie et al.

[11] 3,732,630
[45] May 15, 1973

[54] VISUAL SIMULATOR

[75] Inventors: Richard J. Crosbie, Langhorne; Louis A. Passavanti, Levittown, both of Pa.

[73] Assignee: The United States of America as represented by the Secretary of the Navy, Washington, D.C.

[22] Filed: Oct. 21, 1970

[21] Appl. No.: 82,655

[52] U.S. Cl..................35/12 N, 33/330, 35/12 F, 35/12 W
[51] Int. Cl..................G09b 9/08, B64g 7/00
[58] Field of Search.................35/12 F, 12 N, 12 W; 33/204 C

[56] References Cited

UNITED STATES PATENTS

| | | | |
|---|---|---|---|
| 3,261,912 | 7/1966 | Hemstreet | 35/12 N X |
| 3,471,627 | 10/1969 | Ziegler | 35/12 W X |
| 3,589,019 | 6/1971 | Culver | 33/204 C |
| 2,960,906 | 11/1960 | Fogel | 35/12 F X |
| 3,019,532 | 2/1962 | Haerther et al. | 33/204 C |
| 2,289,877 | 7/1942 | Dreyer | 35/12 N |
| 2,336,436 | 12/1943 | Beindorf | 35/12 N |
| 2,352,101 | 6/1944 | Hutter | 35/12 N |
| 2,474,096 | 6/1949 | Dehmel | 35/12 N |
| 2,591,752 | 4/1952 | Wicklund | 35/12 N |

*Primary Examiner*—Robert W. Michell
*Assistant Examiner*—L. R. Oremland
*Attorney*—R. S. Sciascia and Henry Hansen

[57] ABSTRACT

A visual simulation device for producing pictorial motions of the real world relative to the inside of a cockpit in terms of roll, pitch, yaw and altitude. A first attitude-direction indicator or "eight ball," positionable in accordance with computed flight parameters, is located on an instrument panel. The calibrated markings on a second eight ball, driven in parallel with the first, are replaced with a suitably scaled rendition of sky and terrain. An image of a portion of the second eight ball's surface is projected onto a screen by a zoom lens, located behind a central opening in a parabolic reflector and coiled light source. The screen is viewed by the pilot through a Fresnel lens. The zoom lens is controlled by the computed altitude. The visual simulator is fully compatible with a dynamic G environment such as that produced in a flight simulator gimbaled on the end of a centrifuge arm.

10 Claims, 4 Drawing Figures

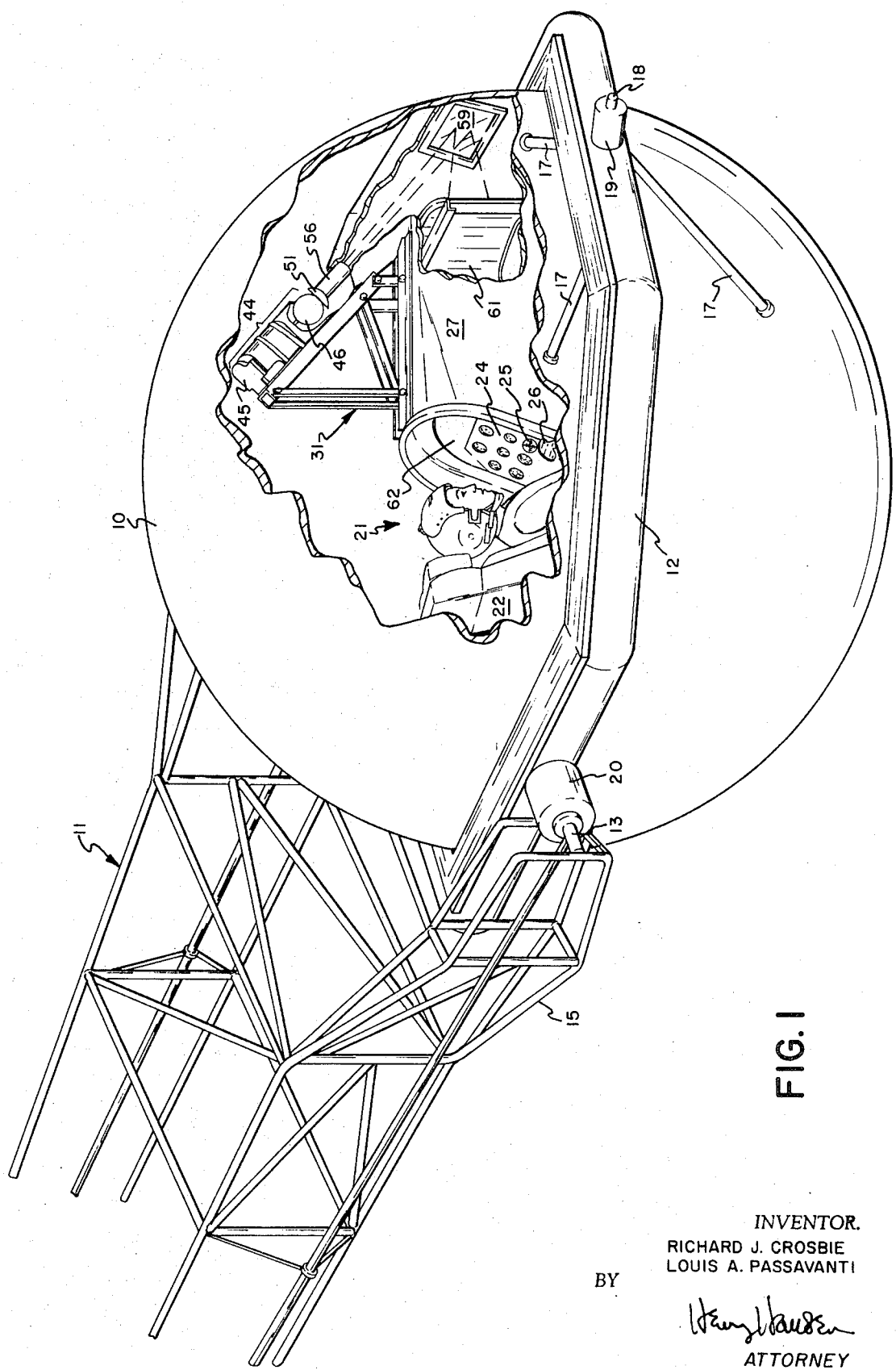
FIG. I
INVENTOR.
RICHARD J. CROSBIE
LOUIS A. PASSAVANTI
BY
ATTORNEY

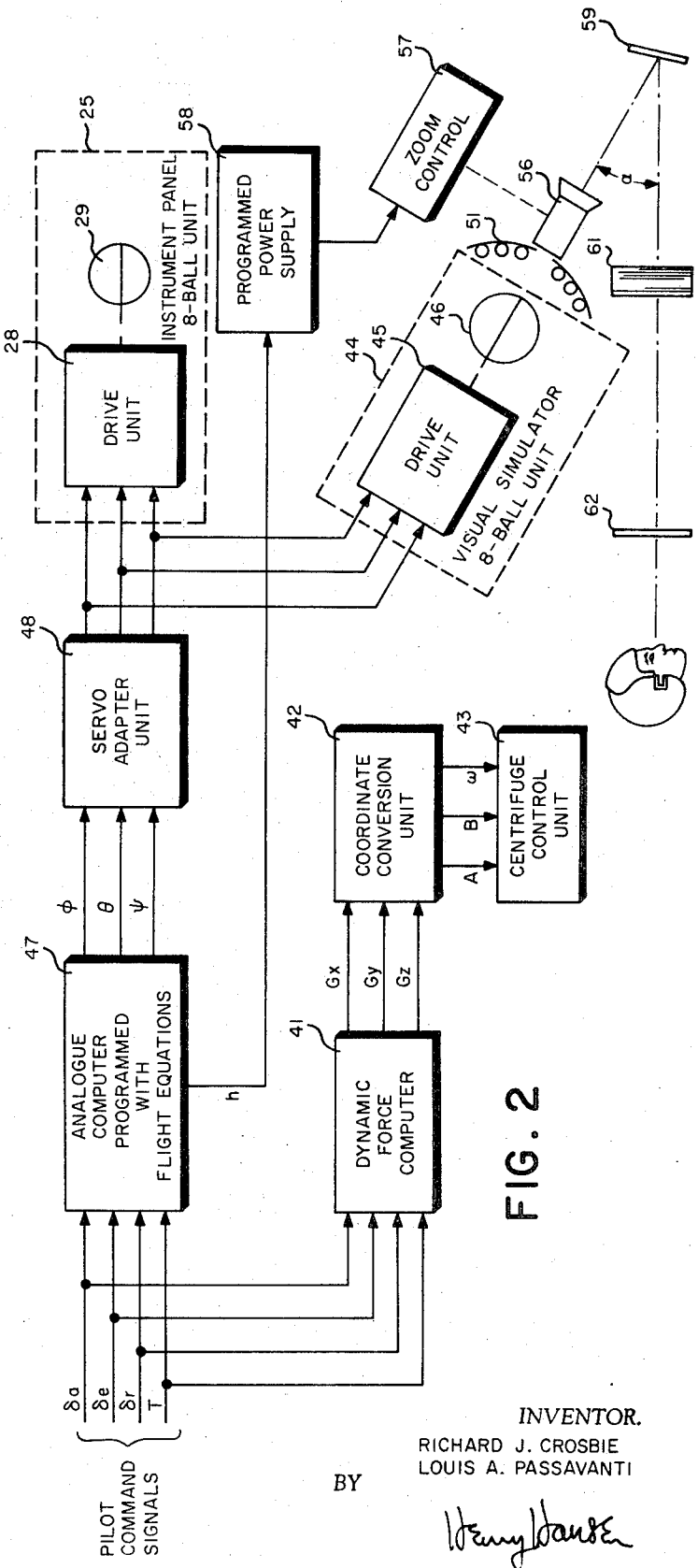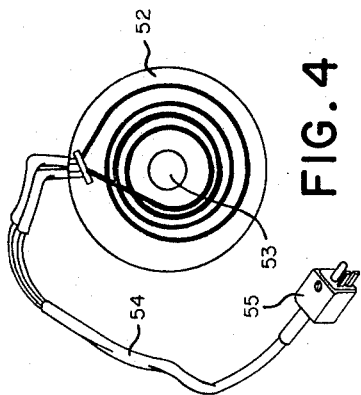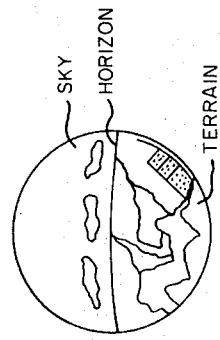

VISUAL SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the field of optics and display devices and more particularly to improved visual displays for flight simulators and the like.

The role of the flight simulator in modern aviation is expanding in response to the increasing costs of aeronautical design, aircraft construction and pilot training. The flight simulator offers a safe, convenient, inexpensive means of familiarizing pilots with particular aircraft environments and of testing handling characteristics and cockpit design.

The worth or effectiveness of a given simulator must be measured by the extent to which the physical and psychological effect on the subject conforms to that which would be experienced in reality. The ultimate flight simulator conceivable is one in which all of the sensory channels such as sight and feel are completely and realistically controlled.

In the past many attempts have been made to present an accurate and believable visual display simulating the view from a cockpit in an airplane executing various maneuvers like turning or diving. One display employed a television camera mounted on a servo-controlled tilt table. The limited size and shape of the cathode ray tube on which the black and white image was presented degraded the quality of the display. Another type of display employed a binocular type optical system through which the operator could view a realistic terrain model. The limited field of view and constraint of the pilot's head probably destroyed the display's authenticity. Other types of displays required large, specially designed optical systems to project a realistic, illuminated image onto a screen. The basic problem with such devices was that they did not use commercially available components and the large optical systems had special power requirements beyond those present in the normal cockpit. It was mechanically difficult also to incorporate the four degrees of freedom necessary to display the effects of pitch, roll, yaw and altitude changes. The optics and control mechanisms were ordinarily too bulky for use in systems where weight and space were critical.

The problem of visual simulation has lately become even more complicated. Real flight maneuvers produce dynamic forces of varying direction and magnitude on the pilot. Devices now exist for simulating these forces. Visual simulator systems located in these devices are necessarily subjected to the same forces as the pilot and must therefore be ruggedized so that the simulator will remain linear over the entire range of G forces produced. Prior art displays, which were at best imperfect in stationary environments, were truly inadequate in the dynamic setting of, for example, a human centrifuge.

SUMMARY OF THE INVENTION

Accordingly, one of the objects of the invention is to perfect the visual display used in flight simulators. Another object of the invention is to produce a compact, lightweight, visual simulator which can fit within any spatial limitations that can accommodate a normal cockpit. A further object of the invention is to provide a visual simulator which is operational in a dynamic G environment. Still another object of the invention is to eliminate the need for additional computer servo equipment to drive a flight simulator over that which is normally used in flight simulators for running the instrumentation. An additional object of the invention is to provide a visual simulator which is simple to assemble and install.

These and other objects are achieved in a flight simulator whose instrumentation panel includes an attitude-direction indicator with three axes of rotation, commonly known as an "eight ball," by slaving a second eight ball therewith driven by the same computer and servo adapter output. The surface of the second eight ball is covered with a pictorial rendition of sky, horizon and terrain and is illuminated by a coiled tubular lamp housed within a parabolic reflector having a hole in the center behind which is positioned a zoom lens. The lens projects an image of the surface onto a curved screen which may be viewed through a Fresnel lens cut to the dimensions of the cockpit windshield. For compact placement in a space limited enclosure, the eight ball may be located above or below the windshield area of the cockpit and the image may be reflected back through the Fresnel lens by a mirror.

BRIEF DESCRIPTION OF THE DRAWINGS

FIG. 1 is a perspective view of a centrifuge flight simulator incorporating a visual simulator according to the invention with portions broken away;

FIG. 2 is a block and schematic diagram showing the electronic and optical elements associated with the visual simulator of FIG. 1;

FIG. 3 is a perspective view of the surface of the rotatable sphere in the visual simulator of FIG. 1; and FIG. 4 is a plan view of the light source of FIG. 2 illuminating the sphere, a typical connector being shown in perspective.

DESCRIPTION OF THE PREFERRED EMBODIMENTS

FIG. 1 shows a spherical capsule or gondola 10 mounted on the free end of a human centrifuge arm 11, the other end of which (not shown) is pivoted for driven rotation about a vertical axis. Gondola 10 is mounted for rotation about two independent orthogonal axes by a gimbal assembly. The first axis, which is perpendicular to radial arm 11 and lies substantially in the plane of rotation thereof, is provided by a tilt table 12 having axles 13, only one of which is visible from the given view. Axles 13 are mounted to arm 11 by means of suitable bearing supported by a bracket 15 connected to arm 11. A second axis of rotation is provided by mounting gondola 10 for rotation within tilt table 12. Gondola 10 has two sets of legs 17, only one set of which is shown, which support axles 18 on either side of gondola 10 journaled in corresponding bearings on tilt table 12. Gondola 10 is rotated about the independent axes by gear assemblies 19 and 20 for axles 18 and 13 respectively driven through long drive shafts, rotatably mounted on either side of arm 11, by servomotors at the center of the centrifuge. The interior of gondola 10 is furnished with a mock cockpit 21 containing a pilot seat 22, instrument panel 24, joy stick 26, and other appropriate aircraft controls. Displacement of the aircraft controls is converted by suitable resistance of selsyn motor means to analog electrical signals designated in FIG. 2, pilot command signals $\delta_a$, $\delta_e$, $\delta_r$ and T. The command signals represent respective changes in aileron, elevator, rudder positions and thrust or throttle. In response to the command signals, the coordinate reference frame of the pilot can be physically altered to orient the resultant force in the same direction as that experienced in actual aircraft operating under the same instantaneous values of the command signals.

The command signals form the input to a dynamic force computer 41 (FIG. 2), such as the EAI Pace 231-R General Purpose Analog Computer, which is programmed to translate the command signals into related signals $G_x$, $G_y$ and $G_z$ indicative of the force vector which would act on the three orthogonal axes relative to the cockpit. For example, $G_x$ may represent the force vector parallel to the longitudinal axis of the airplane. One parameter which would normally increase or decrease $G_x$, therefore, would be thrust T since it is in the axial direction. The resultant vector produced by $G_x$, $G_y$ and $G_z$ is a single force vector oriented in a particular direction with respect to the pilot's body. It is this force vector which orients the pilot and produces part of the effect of motion. The orientation of the force vector contributes to the overall physiological and psychological reaction of the pilot. The magnitude and direction of the force vector must be accurately reproduced by the centrifuge in order to reproduce actual flight conditions which may affect the pilots' response and, in turn, the handling of an aircraft. For this purpose a coordinate conversion unit 42 accepts the computed values of $G_x$, $G_y$ and $G_z$ and converts them to the appropriate values A, B and $\chi$ required by a centrifuge control unit 43 to produce an equivalent dynamic resultant force vector on the pilot in mock cockpit 21. The functions of the elements 42 and 43 may also be performed by the EAI Pace 231-R General Purpose Analog Computer, supra. In gondola 10 there will always be three sources of force: the fixed downward 1G force due to the earth's gravitational field, the radial acceleration force which is a function of $\chi^2$, and the tangential acceleration which is a function of $\dot\chi$, where $\chi$ is angular velocity and $\dot\chi$ is the first derivative thereof. If the centrifuge is undergoing angular acceleration, all three of these orthogonal forces interact vectorially to produce a resultant force. This resultant force is used to simulate the dynamic force vector produced in the airplane. The magnitude of the simulated force is controlled by the angular velocity or change therein. The direction of the force with respect to the cockpit may be changed by the gimbal assembly shown in FIG. 1. The correct angular displacement to be produced by rotation about the two axes is indicated by corresponding analog inputs A and B to centrifuge control unit 43. While the details of the control system used to produce the simulated dynamic force vector do not form a part of the invention, further information on the subject can be found in the article "Directional Control of Acceleration Forces in Centrifuge by System of Gimbals" by Richard J. Crosbie, M.A., The Journal of Aviation Medicine, Volume 27, pages 505-511, Dec. 1956.

Referring briefly to FIG. 1, a three-axis attitude-director indicator 25, commonly known as an eight ball, is located on instrument panel 24. A second attitude-director indicator 44 is located above the cockpit supported by a stand 31 at an angle above a canopy 27. Indicator 44, like indicator 25, comprises a drive unit 45 and rotatable sphere 46. The operation and construction of the eight ball are well known to those in the aeronautical field. The instrument panels of most high performance aircraft as well as flight simulators are now equipped with such devices. Since the attitude-director indicator is a well-defined conventional piece of aircraft equipment, the details thereof will be omitted in the interest of brevity. Further detailed information on a suitable type of eight ball mechanism may be found in NAVWEPS 11-7OFFG-3 handbook, Indicator, Attitude-Director ID-811/AJB-3A, published by the Bureau of Naval Weapons on Mar. 15, 1962. For purposes of the invention it is sufficient to state that the eight ball mechanisms 44 and 25 must be identical in operation, response, and input signal requirements. However, as will be pointed out, sphere 46 in indicator 44 must be modified in certain respects.

To operate indicators 44 and 25, pilot command signals $\delta_a$, $\delta_e$, $\delta_r$ and T are passed to an analog computer 47 programmed with the appropriate flight equations for a given aircraft. The aircraft must, of course, be the same as that for which dynamic force computer 41 is programmed. The output of computer 47 consists of computed values of roll $\phi$, pitch $\Theta$, yaw or heading $\psi$, and altitude $h$. The well-known quantities $\phi$, $\Theta$ and $\psi$ indicate the angular variation of the aircraft cockpit with respect to a fixed three dimensional coordinate system. The same roll, pitch and yaw information is fed via a servo adapter unit 48 to both drive units 28 and 45 in the two eight ball mechanisms. Servo adapter unit 48 functions merely as an interface between computer 47 and drive units 45 and 28 modifying each angular analog signal $\phi$, $\Theta$ and $\psi$ to meet appropriate input requirements of drive units 45 and 28, such as relative voltage level, polarity, or any other input requirements. The servo adapter unit is a part of the prior art system used to drive the conventional eight ball. A gimbal mechanism (not shown) disposed within spheres 29 and 46 in units 25 and 44 respectively executes rotation of the spheres about one or more of three axes of rotation in response to the computed values of $\phi$, $\Theta$ and $\psi$. Standard eight ball unit 25 located on instrument panel 24 carries artificial reference lines (not shown) which may be viewed by the pilot to present a quantitative indication of the change in pitch, roll or heading calibrated in degrees. Eight ball unit 44, however, located above canopy 27 is used to orient a pictorial representation of sky, horizon, and terrain on the surface of sphere 46. The motions of sphere 46, of course, will be identical or slaved with respect to the motions of sphere 29 in eight ball unit 25.

Referring now to FIG. 3 the surface of sphere 46 in visual simulator eight ball unit 44 is covered with a realistic color view of sky and terrain blending together at a horizon. The scaling and detail of the terrain is reduced toward the horizon so that sky and earth tend to merge in the distance as an actual view from an intermediate altitude would appear. The horizon line where sky and terrain meet should coincide with the artificial horizon line on the standard, unmodified eight ball assembly. This line divides the sphere into two hemispheres: one with terrain becoming more detailed away from the line; and one with sky and clouds. With zero pitch and zero roll the horizon line in both eight ball units 25 and 44 should be horizontal and centered in the middle of the visible portion of the spherical surface. Since drive units 28 and 45 are identical, initial synchronizing adjustments should be unnecessary. A portion of sphere 46 is illuminated by lamp 51. Viewed along the optical axis from sphere 46, lamp 51 in FIG. 4 comprises a concave parabolic reflector 52 having a central aperture 53 about which is coiled in a parabolic spiral form a cold cathode tube which emits a low heat, high intensity white light when appropriate voltage is applied to line 54 via plug 55. Referring to FIG. 2, lamp 51 should be located as close as possible to sphere 46 without experiencing undesirable heating effects or obstruction of the field of view. A zoom lens 56 is aligned with aperture 53 to project an image of the visible, illuminated portion of sphere 46. For example, if the sphere 46 has a diameter of 2-3/4 inches, the field of view of lens 56 would typically include a portion of the surface about a half inch in diameter. While the other lenses may be satisfactorily used for lens 56, a suitable lens has been found to be a 1:2.8 lens with a mechanically adjustable focal length of from 36 millimeters to 88 millimeters. Zoom lenses typically change the magnification of an image while maintaining the object in focus. A unitary drive mechanism typically accomplishes these two functions. A zoom control 57 operates a suitable zoom mechanism on lens 56. Control 57, in turn, is powered by a conventional programmable power supply 58 such as a bi-directional, 28 volt, 500 milliamp D. C. servomotor. The input to supply 58 is the altitude analog signal h computed by computer 47. Supply 58 is programmed to cause corresponding variations in magnification by lens 56. Supply 57 must be programmed because the relationship between h and the zoom mechanism on lens 55 would not ordinarily be linear. This relationship could be found and graphed by observing a few typical settings.

Referring briefly to FIG. 1 the location in the mock cockpit of visual simulator eight ball unit 44, light source 51, and zoom lens 56 is seen to be above the canopy 27 which shields the optical elements from external light. Sphere 46 faces downwardly away from the pilot at an angle $\alpha$, illustrated in FIG. 2 as the angle between incident and reflected light from a front surfaced flat mirror 59 positioned in FIG. 1 far forward in gondola 10 to reflect the magnified image of the surface of sphere 46 back into the pilot's view. Light reflected from mirror 59 impinges on a curved translucent screen 61. While several different shapes of screens can be used with minimal distortion, a cylindrical shape has been found satisfactory. The axis of the cylinder would be perpendicular to the optical axis. The convex side of cylindrical screen 61 faces mirror 59. Although difficult to manufacture, a convex spherical surface would also be appropriate in place of cylindrical screen 61. The screen must be curved since the surface of sphere 29 is spherical and, therefore, not all points of the image will be in focus in the same plane. Screen 61 is viewed by the pilot through the cockpit windshield area which is covered with a windshield-shaped portion of a flat Fresnel lens or zone plate 62. In FIG. 1 lens 62 is mounted directly above instrument panel 24 to simulate an out-the-window view of the real world. Lens 62 places the viewer in effect at infinity thus making it appear that screen 61 is positioned outside of the gondola. Fresnel lens 62 also eliminates the problem of parallax while preserving image quality. Since Fresnel lenses have relatively little glass thickness the light from screen 61 is not seriously attenuated as would be the case with other types of optical elements. The use of mirror 59 allows the optical system to be folded over so that the small space available on the centrifuge can be accommodated. For rotation of gondola 10 it is important that the center of mass of the contents be near the center of the sphere. Eight ball unit 44 may be mounted as near the pilot as is consistent with good image quality and high light intensity.

To summarize the operation of the invention, gondola 10 containing mock cockpit 21 is swung in a circular arc by centrifuge arm 11. As the pilot executes flight maneuvers by changing the position of the joy stick, pedals, and throttle, a dynamic force computer 41 is fed analog voltages representing these control maneuvers to produce the force components along the $x$, $y$ and $z$ axes relative to the pilot caused by the pilot's maneuvering. The force components are resolved and translated into centrifuge control signals A, B and $\chi$ representing respectively the gimbal assembly first and second axis rotations of gondola 10 to orient the pilot, and the angular velocity of the centrifuge. The values and variations of $\chi$ produce radial and tangential G forces on the pilot which combine with gravity to produce a resultant force oriented in different directions in accordance with the values of A and B. Along with the dynamic force, a visual display of the real world as it would appear to a pilot in an actual aircraft is afforded by an inventive optical system located completely within gondola 10. The same command signals which feed dynamic force computer 41 are also passed to a computer 47 which produces signals indicative of the computed roll, pitch, yaw, and altitude. Roll, pitch and yaw information is passed via servo adapter unit 48 to two parallel eight ball units 44 and 25. Eight ball unit 25 is located on instrument panel 24 in front of the pilot as in the conventional arrangement present in all high performance aircraft and flight simulators at this time. The second eight ball unit 44 is, however, a new addition and carries a color pictorial representation of the real world, sky and terrain instead of the quantative calibrations normally covering the visible face of the eight ball. Just as the computed values of roll, pitch and yaw cause corresponding variations in the orientation of conventional instrument panel eight ball unit 25, visual simulator eight ball unit 44 undergoes identical displacement relative to its three internal axes. An optical projection system causes an image of the surface of sphere 46 in eight ball unit 44 to be focused upon a screen 61 viewed from behind by the pilot through a Fresnel lens 62 shaped to conform to the cockpit windshield area. Magnification of the image appearing on screen 61 changes in accordance with the computed altitude $h$. Thus, as the pilot manipulates the flight controls, the sky, horizon and terrain will appear to tilt, approach or execute other disorientations in accordance with the known effect of such pilot controls on the actual aircraft. The visual display and the dynamic resultant force combine to form a realistic simulation of actual flight conditions limited only by the quality of the optical components used in the visual simulator.

The cogent advantages of the new visual simulator system lie in the use of existing equipment in a novel arrangement. Since the conventional instrument panel eight ball unit 25 and the visual simulator eight ball unit 44 are identical in operation, power and input signal requirements, the input signals which are already present in all simulators using the conventional eight ball may be simply connected to the second eight ball mounted as shown in FIGS. 1 and 2. Since eight ball units, now mass-produced according to military specification, are known to be G insensitive and are available with high quality aircraft subcomponents, the difficult task of implementing a new G insensitive aircraft quality sphere rotation mechanism is completely eleiminated. The only modification to the old eight ball unit is that of covering the visible surface of the internal sphere with a color pictorial representation of the sky and terrain. Since the sphere drive unit is the same one which is used for conventional eight balls, no additional computer or servo equipment is required over that normally used in most prior art cockpit simulation devices. Another advantage is that the total optical system is compact and can fit within any spatial limitations that can accommodate a normal cockpit. No portion of the visual simulator system except computer 47 is external to the gondola. Another extremely important advantage for those familiar with operation of aircraft equipment is that the visual simulator system is relatively uncomplicated and can be assembled by mechanical and electrical technicians rather than highly trained engineers. Another advantage over most prior art visual simulators is that the image has realistic color unlike most of the prior art television type displays. The novel high intensity lamp used in connection with the zoom lens overcomes the prior art problem of obtaining sufficient light intensity to project an image onto a screen.

Several possible alternatives are also contemplated. Where space limitations permit, mirror 59 may be omitted and eight ball unit 44, light source 51 and zoom lens 56 may be located directly in front of screen 61 on the optical axis thereof. Instead of using a translucent screen, a reflective screen could be used. Such a screen would have to be positioned so that the light could be incident and viewed from the same side. The visual simulator system according to the invention is not limited to centrifuge flight simulators or dynamic force simulators in general although it is particularly adapted to the G environment. The visual simulator system is useful in any simulator which is already equipped with a conventional instrument panel eight ball unit whose input signals are provided by computer and servo adapter units.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A flight simulator system of the type comprising a mock cockpit with a pilot seat, flight controls and an instrument panel opposite the seat, computer means programmed with equations of flight and operatively connected to the flight controls to sense flight data for producing a control signal indicative of roll, pitch and yaw, and first indicator means having a spherical surface with an artificial horizon line for rotation about a plurality of axes and drive means responsive to the control signal operatively connected to the first indicator means spherical surface for selective rotation thereof, wherein the improvement comprises:

second indicator means fixed relative to the cockpit having a spherical surface bearing a pictorial representation of sky and terrain for rotation about a plurality of axes, and drive means responsive to the control signal operatively connected to said second indicator means spherical surface for producing concomitant selective rotation with said first indicator means spherical surface; and optical means fixed relative to said second indicator means for viewing from the pilot seat an enlarged image of said second indicator means spherical surface.

2. A flight simulator system according to claim 1 wherein the improvement further comprises:

said optical viewing means including light means for illuminating a portion of said second indicator means spherical surface, an optical system aligned with said second indicator means spherical surface for projecting an image of the illuminated portion thereof, and viewing screen means operatively oriented with said optical system for intercepting and displaying the projected image.

3. A flight simulator according to claim 2 wherein the improvement further comprises:

said optical viewing means including reflective means operatively aligned with respect to the optical axis of said optical system for reflecting said projected image; and said viewing screen means being operatively aligned to receive the image reflected by said reflective means.

4. A flight simulator according to claim 3 wherein the improvement further comprises:

said optical viewing means including a Fresnel lens operatively positioned between the pilot seat and said screen means such that said screen means is visible from said pilot seat for magnifying an image displayed on said screen means and for displacing from said cockpit the apparent location of said screen means.

5. A flight simulator system according to claim 4 wherein the improvement further comprises:

said viewing screen means including a translucent cylindrical surface the convex surface thereof being oriented to face said reflective means, the cylindrical surface geometric axis being perpendicular to the optical axis thereof.

6. A flight simulator system according to claim 5 wherein the improvement further comprises:

said Fresnel lens being shaped to fit above said instrument panel to occupy the area normally allowing a view of the outside world.

7. A flight simulator system according to claim 2 wherein the improvement further comprises:

said optical viewing means optical system including a zoom lens projecting an image and zoom control means operatively connected to said zoom lens and responsive to a zoom control signal indicative of computed altitude, said computer means producing said zoom control signal, whereby the apparent size of said projected image is caused to vary according to the computed altitude.

8. A flight simulator system according to claim 7 wherein the improvement further comprises:

said zoom control means including a programmed power supply operatively receiving said zoom control signal for producing an output and a drive unit connected to receive said power supply output and drivingly connected to said zoom lens.

9. A flight simulator system according to claim 2 wherein the improvement further comprises:
said optical viewing means light means including a parabolically coiled cold cathode tube and a parabolic reflector centrally housing said tube having a central aperture, the entrance pupil of said zoom lens being operatively aligned with said reflector aperture.

10. A flight simulator system, comprising:
a centrifuge having an arm mounted for driven rotation about a vertical axis;
an enclosure containing a mock cockpit having a pilot seat, flight controls and an instrument panel opposite said seat;
a gimbal assembly mounting said enclosure to the free end of said arm for selective rotation of said enclosure about two independent orthogonal axes;
centrifuge control means responsive to a first control signal for controlling the angular velocity of said centrifuge arm and the angular displacement of said enclosure about said independent orthogonal axes;
first and second computer means programmed with equations of flight and operatively connected to said cockpit flight controls to sense flight data for producing respectively said first control signal indicative of a computed dynamic force vector and a second control signal indicative of computed roll, pitch and yaw;
first indicator means located in said cockpit having a spherical surface with an artificial horizon line for rotation about a plurality of axes and drive means connected to receive said second control signal operatively connected to said first indicator means spherical surface for selective rotation thereof;
second indicator means fixed relative to said cockpit having a spherical surface bearing a pictorial representation of an aerial view of sky and terrain for rotation about a plurality of axes and drive means indicator means connected to receive said second control signal and operatively connected to said second indicator means spherical surface for producing concomitant selective rotation with said first indicator means spherical surface;
light means fixed relative to said second indicator means for illuminating a portion of said second indicator means spherical surface;
a lens system aligned with said second indicator means spherical surface and fixed relative thereto for projecting an image of the illuminated portion thereof; and
screen means operatively positioned to be visible from said pilot seat for intercepting and displaying the projected image.

* * * * *